United States Patent [19]

Abell

[11] 4,188,167

[45] Feb. 12, 1980

[54] APPARATUS FOR ALIGNING AN INSPECTION OR REPAIR DEVICE WITH A SELECTED TUBE IN A HEAT EXCHANGER

[75] Inventor: Gary E. Abell, Norton, Ohio

[73] Assignee: The Babcock & Wilcox Company, New Orleans, La.

[21] Appl. No.: 884,305

[22] Filed: Mar. 7, 1978

[51] Int. Cl.² .................................................. F28G 15/02
[52] U.S. Cl. ..................................... 414/744; 165/76; 318/625; 414/749
[58] Field of Search ............. 214/1 CM, 1 BB, 1 BC; 414/744, 749, 751, 753; 165/76; 318/625

[56] References Cited

U.S. PATENT DOCUMENTS 3,760,956  9/1973  Burch ............................. 214/1 BB
3,934,731  1/1976  Muller ........................ 214/1 CM X Primary Examiner—Stephen G. Kunin
Assistant Examiner—George F. Abraham
Attorney, Agent, or Firm—John F. Luhrs; J. M. Maguire

[57] ABSTRACT

Apparatus including a portable manipulator for the axial alignment of an inspection or repair device with a selected tube in a heat exchanger. The manipulator is angularly positionable about a center toward and away from an arbitrarily chosen axis and radially toward and away from the center by remotely controlled servomotors. Incorporated in the manipulator are position feedback devices whereby the manipulator is positioned to the predetermined polar coordinates of the selected tube.

8 Claims, 4 Drawing Figures

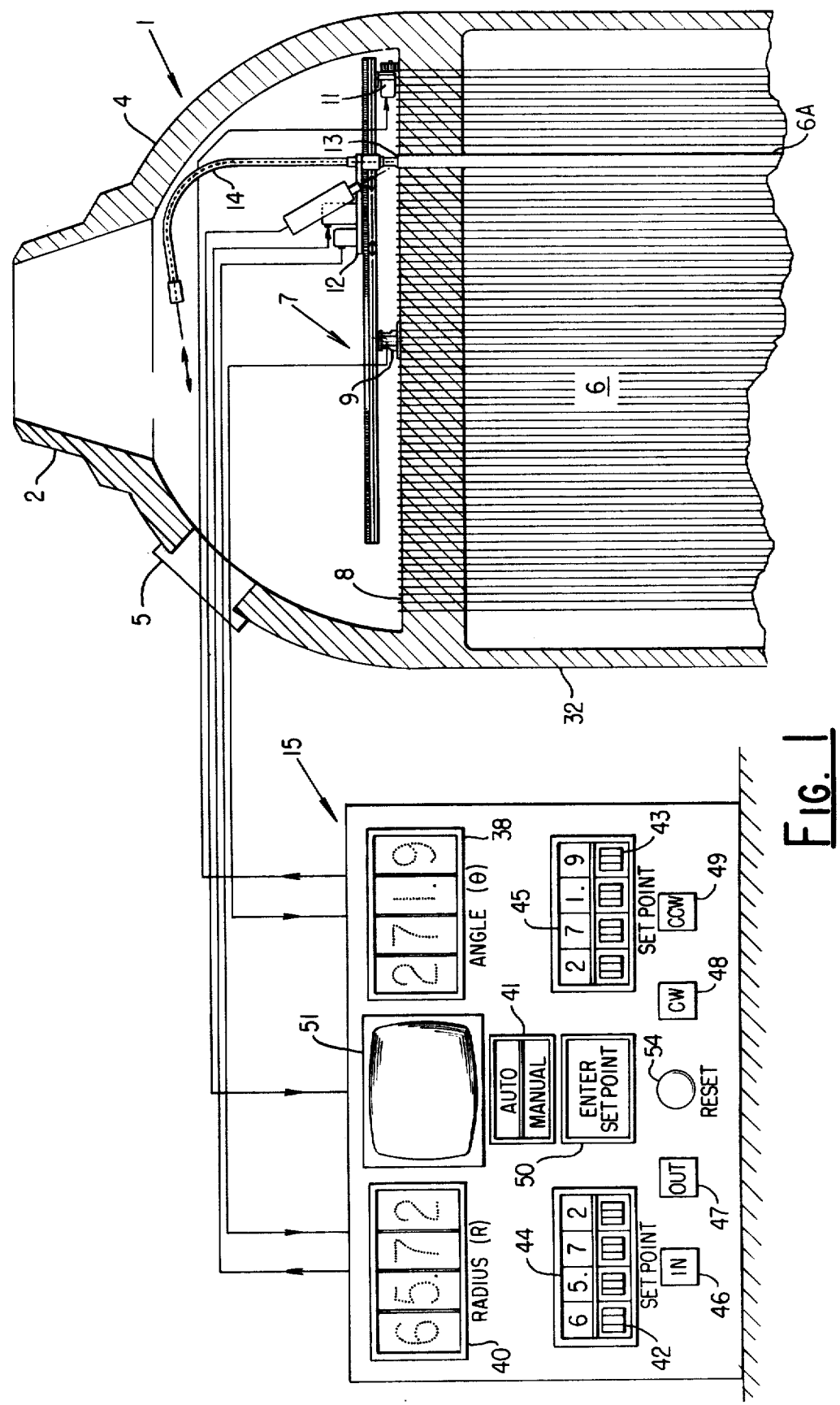

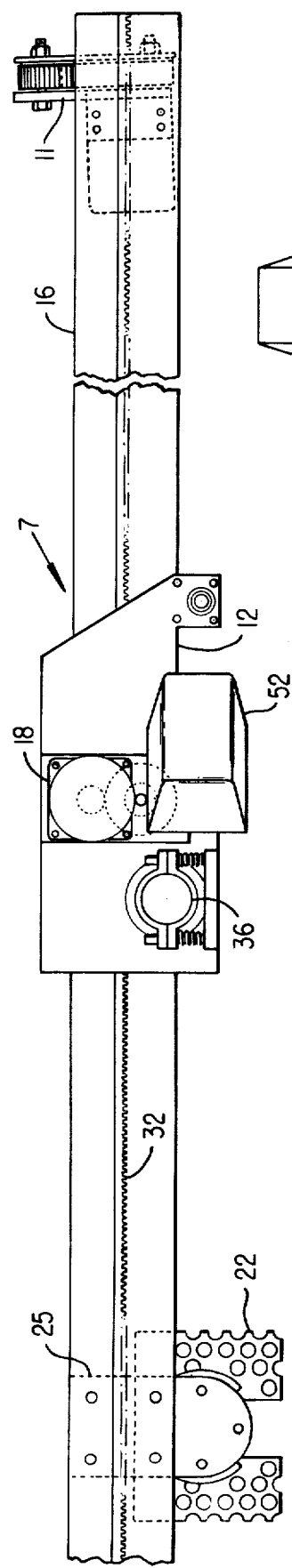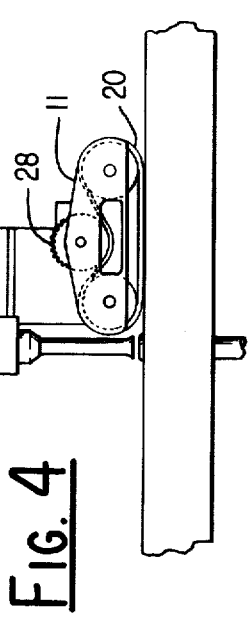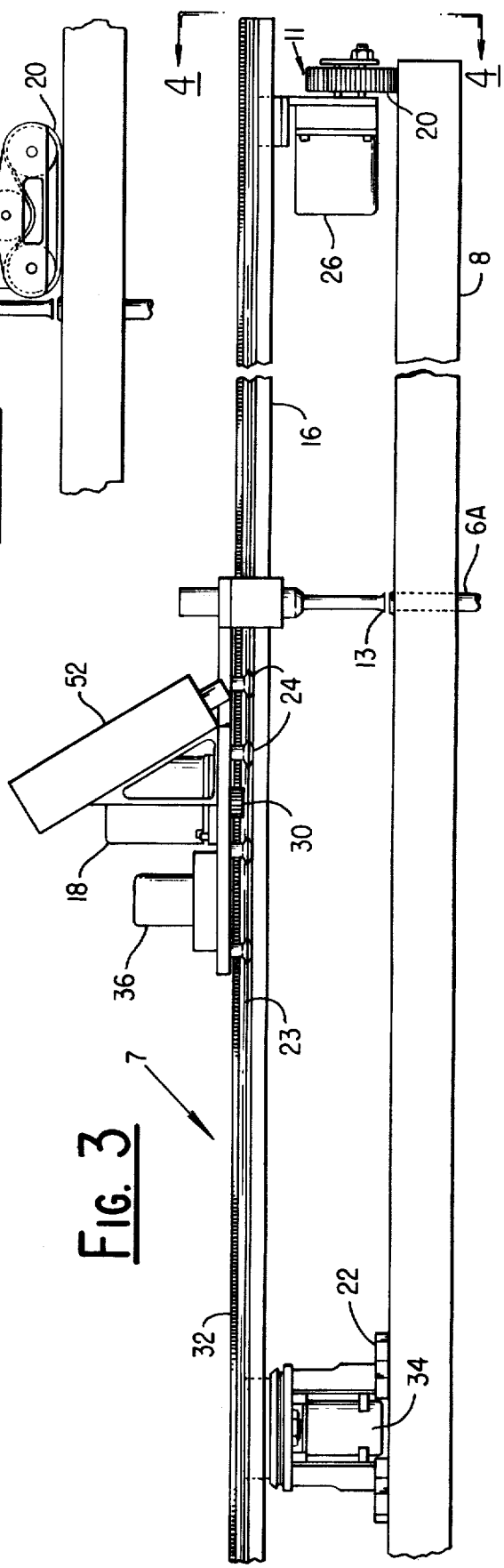

APPARATUS FOR ALIGNING AN INSPECTION OR REPAIR DEVICE WITH A SELECTED TUBE IN A HEAT EXCHANGER

BRIEF SUMMARY OF THE INVENTION

This invention relates to apparatus for the axial alignment of an inspection or repair device with a selected tube in a heat exchanger having a plurality of tubes. While adaptable to heat exchangers having a wide variety of tube configurations, it is particularly adaptable for use with heat exchangers in hostile environments wherein the inspection or repair device must be brought into alignment with a selected tube by means of a remotely controlled manipulator.

Typical of heat exchangers in a hostile environment are the steam generators incorporated in a nuclear power producing unit. A manipulator to be suitable for such an application must require a minimum of human exposure time for installation and removal with maximum reliability and accuracy in positioning the inspection or repair device into axial alignment with a selected tube from a remote control station located in a benign environment. It is to these objectives that this invention is primarily directed.

Further objectives will be apparent as the description proceeds in connection with the drawings in which:

IN THE DRAWINGS

FIG. 1 is a schematic illustration of the invention as applied to a once-through nuclear steam generator (OTSG).

FIG. 2 is a detailed top plan view of the manipulator.

FIG. 3 is a side elevation view of the manipulator shown in FIG. 2.

FIG. 4 is an end elevation view of the manipulator shown in FIGS. 2 and 3 taken along the line 4—4 of FIG. 3 in the direction of the arrows.

DETAILED DESCRIPTION

Referring now to the drawings wherein like reference characters designate like or corresponding parts throughout the several views, there is shown in FIG. 1 in vertical cross section the upper part of a typical OTSG generally indicated at 1, having a cylindrical shell 3, an upper hemispherical head 4 and an upper tube sheet 8. The tube sheet 8 serves both to isolate the interior of the tubes, generally indicated at 6, and along with spaced support plates and a bottom tube sheet (not shown) to maintain the tubes in a predetermined fixed configuration. A typical OTSG of the type shown may be approximately 68 feet in height, 13 feet in diameter and include upwards of 16,000 tubes each having an OD of approximately 0.625 inches, a wall thickness of approximately 0.034 inches and a length of approximately 60 feet.

Reactor coolant enters the OTSG through a nozzle 2, flows downward through the tubes and out at the bottom. Feedwater surrounding the tubes is converted into steam and superheated in a single pass and discharged from the OTSG through suitable ports or nozzles (not shown).

Periodically it is essential that a certain number of tubes, selected in accordance with a predetermined schedule, be inspected. Inspection is typically made by traversing each selected tube with an eddy current probe. For illustrative purposes there is shown in FIG. 1 to enlarged size a specific tube 6A as one selected for inspection. A located defect is then repaired by introducing a suitable repair device, or if that is impossible, the tube may be replaced or plugged at the upper and lower tube sheet. Because of the hostile environment within the OTSG it is necessary that the positioning of the inspection probe or repair device into alignment with selected tubes be controlled from a remote point where operators may be stationed with less regard to exposure time to deleterious radiation and the like.

In accordance with this invention, in making a tube inspection there is installed in the OTSG through a manway 5, a manipulator, generally indicated at 7, which includes a track or beam 16, supported by and rotatable about a pedestal 9, which is placed at the center of the tube sheet 8, and a caterpillar tractor 11 arranged to traverse the outer perimeter of the tube sheet. The manipulator also includes a radially movable carriage 12 carrying a more or less flexible goose neck 14 terminating in an instrument guide 13 through which an inspection or repair instrument may be inserted into and withdrawn from a selected tube. The angular positioning of the beam 16 about the pedestal 9 and the radial positioning of the carriage 12 required to bring the instrument guide 13 into axial alignment with the selected tube is remotely controlled from a control center, generally indicated at 15.

The pedestal 9 is provided with a perforated bottom plate 22 as an aid in accurately locating and stabilizing the manipulator at the center of the tube sheet 8. The carriage 12 is supported by and guided along the beam 16 through wheels 24 engaging V-shaped ways formed in the beam, which is offset from the center of rotation by a bracket 25 so that the instrument guide 13 will remain in line with the center of rotation as the carriage 12 traverses the beam 16. The caterpillar tractor 11 is angularly located relative to the beam 16 so that the center line of the tread 20 is at right angles to a radius crossing the center of the track or beam 16.

The beam 16 is rotatable about the pedestal 9 in clockwise and counterclockwise directions by a servomotor 26 operatively connected to the tread 20 through suitable gears, such as shown at 28. The carriage 12 is linearly driven in forward and reverse directions along the beam 16 by a servomotor 18 having a pinion 30 engaging a rack 32 on the beam 16. A feedback signal of the angular position of the instrument guide 13 from an arbitrarily selected axis of the tube sheet 8 is generated by an absolute encoder 34 located at the axis of rotation of the beam 16. A feedback signal of the radial distance of the instrument guide 13 from the axis of rotation is generated in an absolute encoder 36 mounted on the carriage 12 and operatively connected to the rack 32 through suitable gearing (not shown).

As shown in FIG. 1, the feedback signals corresponding to the actual angular and radial position of the instrument guide 13 as established by encoders 34 and 36 are transmitted to the control center 15 and displayed on readout devices such as LED'S, 38 and 40. By means of manually operated thumb wheels 43 and 42, set point signals corresponding to the angular and radial coordinates of a selected tube are generated and displayed on readout devices 45 and 44 respectively.

In the control center there is generated an output signal corresponding to the difference between the angular feedback signal and the angular set point signal as established by thumb wheels 43 which, directly or indirectly, operates the servomotor 26 until the feedback signal is equal to the set point signal. Similarly, there is generated in the control center an output signal corresponding to the difference between the radial feedback signal and the radial set point signal, as established by thumb wheels 42 which, directly or indirectly, operates the servomotor 36 until the feedback signal is equal to the set point signal. When the feedback and set point signals are equal or stand in predetermined relationship the instrument guide 13 will be axially aligned with a tube 6 having the coordinates corresponding to the set point signals displayed in readout devices 45 and 44.

The circuitry necessary for the generation of the output signals from the set point and feedback signals is well within the state of the art and accordingly has not been illustrated or described in detail. It will further be apparent to those skilled in the art, that the set point and feedback signals may input to circuit components or to a programmed micro-computer for manipulation as required to generate output signals having desired characteristics such as proportional-integral, proportional-derivative and the like so that the manipulator will move the instrument guide 13 precisely from one set of coordinates to another at maximum speed without overshoot or hunting. Further, as will be evident to those skilled in the art, the circuitry may include components, or a computer incorporated in the control center may be programmed so that the manipulator will travel the shortest path in moving the instrument guide 13 from one set of coordinates to another.

While the polar coordinates of each tube in the OTSG could be empirically determined by moving the instrument guide 13 into alignment with each tube and noting the radius (R) and angle (θ) as exhibited on the readout devices 40 and 38, however, as the holes in the tube sheet of a nuclear steam generator receiving the tubes are located with extreme accuracy, the dimensions utilized in locating the axial center lines of the holes may be used to determine the set points of each tube. As shown, if required, the set points so determined may be corroborated by means of closed circuit television comprising a camera 52 focused on the tube sheet 8 proximate the instrument guide 13 and a receiving unit 51 located at the control center 15. If a discrepancy is found, the operation of the servomotors 26 and 18 may be transferred from Automatic to Remote Manual by means of transfer switch 41 and the servomotors operated by means of push buttons 46–49 to bring the instrument guide 13 into alignment with the selected tube. The setpoints of the selected tube can then be corrected to agree with those displayed on readout devices 38 and 40. In the event of failure of the control circuitry, or if for any other reason it is found desirable or necessary, the instrument guide 13 can be positioned to the coordinates of a selected tube by means of the push button 46–47 and 48–49 with the Selector Station 41 in Manual and operation of the readout devices 38, 40 or television receiver 51.

At the start of a scan, or if at any time thereafter, during a scan there is found to be a discrepancy between the coordinates exhibited on readout devices 40 and 38 and those exhibited on set point devices 42 and 43, the former may be brought into agreement with the latter by means of Reset Switch 54 which introduces bias or off-set signals into the control circuitry adding to or subtracting from the feedback signals to eliminate the discrepancy.

I claim:

1. Apparatus for axially aligning an instrument guide with a selected one of a plurality of tubes in a heat exchanger having a flat circular tube sheet through which each of said plurality of tubes penetrates, comprising a beam, a fixed member supported on said tube sheet proximate the center thereof having an axis about which said beam is rotatable in a plane parallel to said tube sheet, a first servomotor operatively connected to said beam for angularly positioning said beam about said axis in clockwise and counterclockwise directions, a carriage having an instrument guide mounted on said beam, a second servomotor operatively connected to said carriage for radially moving said carriage toward and away from said axis, means operatively connected to said beam generating a first feedback signal proportional to the angular displacement of said instrument guide from a selected base radius and means operatively connected to said carriage generating a second feedback signal proportional to the radial displacement of said instrument guide from a predetermined radius.

2. Apparatus as set forth in claim 1 further including means generating a first set point signal proportional to the angular displacement of the selected tube from the selected base radius, means generating a second set point signal proportional to the radial displacement of the selected tube from said predetermined radius, means for comparing said first feedback signal with said first set point signal, means for comparing said second feedback signal with said second set point signal, means for operating said first servomotor to bring said first feedback signal into agreement with said first set point signal and means for operating said second servomotor to bring said second feedback signal into agreement with said second set point signal to thereby position said instrument guide into axial alignment with the selected tube.

3. Apparatus as set forth in claim 2 wherein said heat exchanger is a nuclear once through steam generator having a horizontal circular tube sheet through which each of said plurality of tubes penetrate, said fixed member comprises a pedestal disposed at the center of said tube sheet and the operative connection between said first servomotor and said beam comprises a caterpillar tractor on which said first servomotor is mounted and supporting said beam proximate the outer perimeter of the tube sheet through a traveling belt resting on the surface of said tube sheet disposed at substantially a right angle to said beam and an operative connection between said first servomotor and said traveling belt.

4. Apparatus as set forth in claim 3 wherein said second servomotor is mounted on said carriage and said beam includes a rack engaging a pinion driven by said second servomotor.

5. Apparatus as set forth in claim 4 wherein the means generating the first feedback signal is a first absolute encoder and the means generating said second feedback signal is a second absolute encoder.

6. Apparatus as set forth in claim 5 wherein said first absolute encoder includes a rotor secured to said beam at said axis of rotation and said second absolute encoder is mounted on said carriage and includes a rotor having a pinion and a gear drive between said pinion and said rack.

7. Apparatus as set forth in claim 6 further including manually operated reset means for modifying said first and second feedback signals to bring them into correspondence with the first and second set point signals respectively of a selected tube.

8. Apparatus as set forth in claim 7 further including a control center remotely located from the nuclear once through steam generator including means exhibiting said feedback and set point signals and including means generating a first output signal corresponding to the difference between said first feedback signal and said first set point signal effecting operation of said first servomotor to bring said first feedback signal into correspondence with said first set point signal and including means generating a second output signal effecting operation of said second servomotor to bring said second feedback signal into correspondence with said second set point signal.

* * * * *